March 7, 1967 F. V. HALL Re. 26,169

DEVICE FOR CONTROLLING THE HYDROCARBON EVAPORATION LOSSES FROM AUTOMOTIVE VEHICLES

Original Filed Aug. 18, 1960

INVENTOR.

FRED V. HALL

BY A Dunham Owen

ATTORNEY

United States Patent Office

Re. 26,169
Reissued Mar. 7, 1967

26,169

DEVICE FOR CONTROLLING THE HYDROCARBON EVAPORATION LOSSES FROM AUTOMOTIVE VEHICLES

Fred V. Hall, San Francisco, Calif., assignor to Brooks Walker, San Francisco, Calif.

Original No. 3,191,587, dated June 29, 1965, Ser. No. 50,509, Aug. 18, 1960. Application for reissue Feb. 28, 1966, Ser. No. 536,530
20 Claims. (Cl. 123—136)

Matter enclosed in heavy brackets [ ] appears in the original patent but forms no part of this reissue specification; matter printed in italics indicates the additions made by reissue.

This invention relates to a device to control the hydrocarbon evaporation losses from automotive vehicles. More particularly, it controls the hydrocarbon evaporative loss from the carburetor and gas tank of automobiles and trucks.

It has been established that automobiles constitute a significant source of atmospheric pollution, leading to the smog problem in many cities. In Los Angeles automobiles appear to be the major source. While the bulk of the polluting emissions come from the automobile exhaust, in the form of unburned hydrocarbons and nitrogen oxides, unburned hydrocarbons also pass into the atmosphere from the carburetor and fuel tanks by evaporation. While the amount may not seem to be great enough in one automobile to cause the owner to think he is suffering from this waste, the compounding of the pollution effect by millions of automobiles in such areas as Los Angeles has led to major problems. The present invention is intended to solve this problem of evaporation loss, just as my Patent 2,809,623 solves the problem of keeping the unburned hydrocarbons escaping via the automobile exhaust within allowable limits.

There are several kinds of hydrocarbon loss by evaporation from automobiles:

(1) Carburetor running loss.—This term refers to the loss of hydrocarbon vapors from the carburetor through external vents while the engine is running. Most carburetors are equipped with external vents for the purpose of releasing the vapors boiling off in the carburetor, because if such vapors are not vented, the air-fuel mixture tends to become richer at elevated temperatures. External ventilation results, however, in a loss of fuel by evaporation while the engine is running (hence the term running loss), the amount of loss generally being highest during engine idling at times when the engine is hot after a prolonged run at high speed or high ambient temperature or both. However, significant amounts may also be lost during cruising and other operating phases. Some carburetors are internally vented; these, while not having this problem, have heretofore accentuated the exhaust problem by causing rough engine operation, due to overrich mixtures at high under-hood temperatures, and they have upset the air-fuel ratio that the carburetor is intended to provide.

(2) Carburetor "hot soak" loss.—When an engine stops running after having become hot, the carburetor tends to be heated by the "soak back" of engine heat. The temperatures in the carburetor bowl rise substantially after a hot shutdown, and this increase in temperature boils fuel out of the carburetor bowl (hence the term "hot soak" loss), the boiled-out fuel passing to the atmosphere via the external vent or the air cleaner in the form of unburned hydrocarbons. This hot soak loss occurs during about the first half-hour after shutdown of a hot engine; after this time, the loss is relatively insignificant, because by that time the more volatile portions of the gasoline in the carburetor bowl have already evaporated and the engine has become cool.

(3) Tank breathing loss.—Temperature fluctuations cause the gasoline tank to "breathe," due to expansion and contraction of the gases in the vapor space above the liquid level. Hydrocarbon vapors are forced out of the tank during expansion, hence the term "tank breathing loss." The vapor pressure of the summer grade of gasoline is roughly eight pounds per square inch at 100° F., and therefore the amount of evaporation is significant, especially on a hot day. The evaporated gasoline passes through the vent line of the gasoline tank out into the atmosphere.

(4) Tank filling loss.—When a gasoline tank is being filled at the filling station, a volume of hydrocarbon vapor and air approximately equivalent to the amount of liquid gasoline added into the tank is displaced and passes into the atmosphere, thereby aggravating the problem.

(5) Overflow loss.—When a gas tank is overfilled or when an automobile is parked in an inclined attitude, as on the hills in many cities, an overflow of liquid gasoline may pass through the vent line, spill on the ground, and subsequently evaporate into the atmosphere.

The present invention solves all five of the above problems by a novel combination of elements. For example, carburetor running loss is controlled by inducting the vapors into the intake air of the engine while supplying additional combustion air with a thermal leaning device. This thermal leaning device also operates to prevent rough engine operation that tends to result when the carburetor is internally vented. In the invention, the normally external vents of the carburetor are plugged if there are ample internal vents, or the external vents are diverted so that they vent internally, thus completely eliminating carburetor running loss.

The invention solves the problem of hot soak loss by trapping the vapors in an activated adsorbent or in an absorbent, which is later automatically regenerated by desorbing. A mechanism is provided for actuating the adsorber or absorber system during only the first half hour and then turning the mechanism off automatically. Instead of being timed, however, the mechanism is preferably deactuated by temperature so that when the engine is cool, this device is turned off.

The invention prevents the evaporative losses due to tank breathing and filling by guiding the vent line from the tank through the adsorbing or absorbing mechanism. Furthermore, the invention provides a novel connection at the tank inlet spout and a filling nozzle adapter, which may be used at the service station to obtain a vapor-tight connection between the service station dispensing pump and the fuel tank.

Finally, the invention prevents the losses that tend to occur when the tank overflows, not only by routing the vent line through the absorbing or adsorbing agent but more particularly by providing an elevated gooseneck with an ample drop-out pot or liquid trap that prevents overflow and spillage loss.

Other objects and advantages of the invention will appear and the above ones will be explained more clearly and understood better from the following description of a preferred embodiment of the invention presented in accordance with the statutes.

Figures 1, 2, 3, 4:
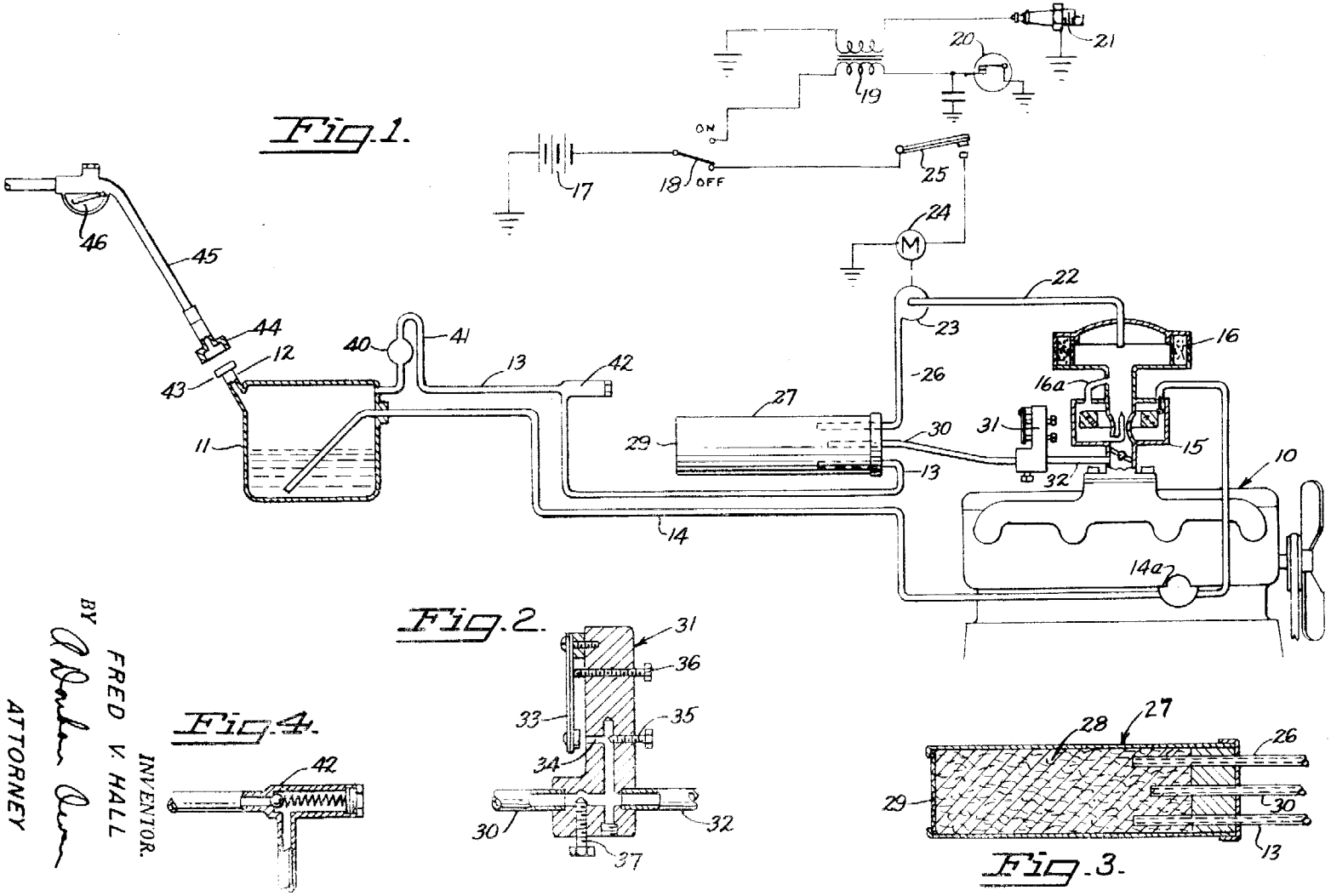
FIG. 1 is a schematic diagram of a system embodying the principles of the present invention for preventing evaporation losses from an automotive engine and fuel system.
FIG. 2 is an enlarged view in elevation and in section of a thermal leaning and idle air device of the type that may be used in this invention.
FIG. 3 is an enlarged view in elevation of a regenerative absorbing or adsorbing filter that may be used in this invention.
FIG. 4 is an enlarged view in elevation of a spring-loaded check valve of a type that may be used in this invention.

FIG. 1 shows a gasoline engine 10 and pertinent portions of a system concerned with this invention. Its fuel system comprises a gas tank 11 provided with a filling spout 12, a vent line 13 and a fuel line 14. The fuel line 14 leads via a fuel pump 14[a] to a carburetor 15, which has an air cleaner 16 for intake air and is vented internally by a tube 16[a]. Similarly, a circuit diagram of a portion of the engine's ignition system is shown, with a battery 17, an on-off switch 18, a coil 19, a distributor 20, and a spark plug 21.

The present invention provides a duct 22 that leads from the air cleaner 16 to an electrically driven air pump 23 having a motor 24. The motor 24 and air pump 23 are operated only when the ignition switch 18 is in the off position and only when a bimetallic thermal delay switch 25 is closed. This thermal delay switch 25 is mounted where it will be sensitive to engine heat; it may be on the exhaust manifold (not shown) or some other similarly convenient location. When the manifold (and engine) is hot, the switch 25 is closed, but it opens when the manifold cools, the temperature characteristics of the switch 25 being adjusted to give the proper opening time, usually corresponding to a normal delay of about one-half hour. Thus, it will be evident that the air pump 23 operates only when the engine 10 is both off and hot.

A discharge line 26 from the air pump 23 leads to a filter 27 (FIG. 3) containing suitable absorbent or adsorbent material 28 such as charcoal, oil on crushed fire brick, or any other suitable gasoline-adsorbing or absorbing material. The fuel tank vent line 13 also leads to the same filter 27. One end of the filter 27 is open to the atmosphere through a screen 29. A conduit 30 from the filter 27 leads to a thermal leaning device 31, which is connected by an idle air duct 32 to the carburetor 15. The thermal leaning device 31 may be that shown in my Patent 2,809,623 or other means for leaning the carburetor mixture when the temperature gets hotter. It is shown in somewhat more detail in FIG. 2. It will be noted that the line 30 enters opposite the line 32 and that there is a bimetallic thermally operated pad valve 33 that controls air flow from outside air into a passage 34. The passage 34 is restricted by a needle valve 35, so that the needle valve 35 controls the air flow of supplementary fresh air which is added as the temperature rises. A temperature range screw 36 may be provided to vary the activating temperature of the thermal element 33. The basic idle air requirement of the engine is controlled by an adjustment valve 37.

In the vent line 13 between the tank 11 and the filter 27 there is a drop-out pot 40 elevated above the tank 11 in a gooseneck 41 to retain liquid gasoline and return it to the tank 11. There is also a spring-type check valve 42 (FIG. 4).

An opening 43 on the spout 12 of the gasoline tank 11 is connected to and closed by an adapter 44 on the nozzle spout 45 when filling the tank 11 from a conventional automatic shutoff service station nozzle 46, to provide a vapor-tight connection at that point.

OPERATION

When the fuel tank 11 is filled with gasoline, a vapor-tight connection is provided by the adapter 44, which may have a neoprene seal at both ends. All the gasoline vapors then in the tank 11 are displaced through the vent line 13 rather than passing back up out of the spout 12. Thus, they pass to the filter 27 where the vapors are absorbed or adsorbed to a very large degree.

All gasoline tanks which are normally vented to the atmosphere breathe, and when they breathe they exhale some gasoline vapor. Moreover, since gasoline has a rather high vapor pressure, loss constantly occurs during hot days due to evaporation, and this loss is increased by the breathing action of the tank. In this invention, as has been shown, the exhaling action takes place only through the activated carbon 28 or other adsorbent or absorbent in the filter 27, which sorbs the hydrocarbon vapors with a high degree of efficiency.

Tank overflow loss has heretofore been combatted by simply placing the vent line 13 in the tank 11 at the highest point and by providing an elevated gooseneck 41. However, these vents are not elevated enough to prevent overflow loss under all conditions, and frequently vehicles parked in an inclined attitude or speeding around corners have lost gasoline out of the overflow vent. Here, the drop-out pot 40 just below the highest point in the gooseneck 41 protects against this. In the event that the liquid gasoline is forced through the vent 13, it collects in the dropout pot 40 and later drains back into the gasoline tank 11.

During operation of the vehicle, carburetor running loss is prevented by inducting the vapors into the intake air of the engine via the internal vent 16[a] supplying additional combustion air through the thermal leaning device 31 to prevent abnormal enrichment of the mixture, according to my Patent 2,809,623. This invention also calls for either plugging the normal external vent to the carburetor 15, if there are ample internal vents, or diverting them so that they do vent internally. The carburetor 15, being internally vented by the vent 16[a], has no carburetor running loss, and the thermal leaning device 31 prevents overrich air-fuel ratio from being furnished to the invention and prevents rough engine operation, which is itself a cause of excessive exhaust pollutants, as explained in Patent 2,809,623.

After the automobile has been run a while and then is parked, the engine heat soaks back to the carburetor 15 and boils off vapors which have heretofore been emitted either through the air horn or through external vents of the carburetor. In the present invention the vapors are trapped in the filter 27 and absorbed or adsorbed by the agent 28 therein. Thus, when the engine 10 is shut down, the ignition switch 18 is turned to the engine's "off" position, which is the "on" position for the motor 24. If the engine manifold is hot, the switch 25 will be closed. The switch 25, a simple bimetallic thermal element adjusted to open when the engine temperature drops below a desired level, will, when the engine is hot, conduct current from the battery 17 and this results in energizing the motor 24 for the air pump 23, which then pumps the air laden with gasoline vapors from the air cleaner 16 and the carburetor vapors into the filter 27 through the conduits 22 and 26. In about one-half hour the exhaust manifold will have cooled to the point (e.g., 180° F.) where the thermal switch 25 opens and shuts off the air pump 23, it no longer being required. In fact, the thermal switch 25 will open even when the under-hood hempertaures are quite hot, as they are when the car is parked in the sun on a hot day, for the temperature of a hot exhaust manifold of an engine that has been running is much hotter than such under-hood temperatures due to the sun.

The adsorber or absorber 28 connects and retains the hydrocarbons from the hot soak loss, the tank breathing loss, and the tank filling loss. In order for the absorber or adsorber to continue to function efficiently, it might be thought that fresh activated carbon would be required periodically, but this would be undesirable both from an expense and convenience standpoint; so the present invention provides a system for automatically regenerating the carbon or other agent 28 after each engine start-up and during the subsequent normal operation of the vehicle. This is accomplished by a reverse-flow process in which the idle air requirement is drawn into conduit 30 through the carbon absorber in the reverse direction. Thus, by connecting the tube 30 to the absorber or adsorber filter 27, a portion of the engine air requirement flows in reverse through the carbon adsorber during all part-throttle operation, passing through the thermal leaning device 31, and then through the conduit 32 to the carburetor 15. During such operating cycles as low-power cruise or idle, whenever, a relatively high partial vacuum exists in the intake manifold, this reverse air flow through the conduit 30 will result. The air flow requirement of the engine is very large in comparison with the small quantities of vapors adsorbed on the carbon and so this large quantity of air passing through the adsorber desorbs the hydrocarbon vapors from the carbon and these are subsequently burned in the engine. The engine fuel requirement being very large in comparison with the small amount and low rate at which these vapors are introduced into the engine, no significant change in the air fuel ratio occurs in the engine, yet these materials are used.

Thus, the present invention, especially when used in combination with the thermal leaning device 31 of my Patent 2,809,623, cuts down the evaporation losses from automobiles to a negligible amount. Thereby it can considerably alleviate the smog problem if the device is installed on a substantial number of automobiles in an area.

If desired, in place of the filter 27 a device for catalytic or glow-plug-type combustion may be provided or, if desired, a non-regenerative system may be used by changing the filter cartridge 28 periodically, although, as said before, this is somewhat less desirable, being more expensive and also more wasteful.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A device for the control of evaporation losses from an automobile having an engine, an engine ignition switch, a carburetor, an air cleaner therefor, and a gasoline tank with a vent line and with a fuel line connected to the carburetor, including in combination: thermally actuated leaning means for sending additional intake air into said carburetor for leaning the fuel mixture as the temperature rises; means to vent the gasoline vapors evaporated from said carburetor into said air cleaner; filter means for withdrawing gasoline from air, said gasoline tank vent line being connected to said filter means; air conduit means from said air cleaner to said filter means; air pump means for said air conduit; thermally actuated means connected to said engine ignition switch for operating said air pump when said engine ignition switch is off and said engine is hot and until said engine cools; and filter-regenerating means, comprising means for taking in atmospheric air through said filter into said thermal leaning device for supply to said carburetor.

2. A device for the control of gasoline evaporation losses from an automobile having an engine, an engine ignition switch, a carburetor, an air cleaner therefor, and a gasoline tank with a vent line and with a fuel line connected to the carburetor, including in combination: thermally actuated leaning means connected to said carburetor for sending additional intake air into said carburetor for leaning the fuel mixture as the temperature rises; filter means for withdrawing gasoline from air, said gasoline tank vent line being connected to said filter means; air conduit means from said air cleaner to said filter means; air pump means for said air conduit means; and thermally actuated means for operating said air pump when said engine ignition switch is off and said engine is hot and until said engine cools to a desired temperature.

3. A device for the control of evaporation losses from an automobile having an engine, a carburetor, a fuel tank, a fuel line connecting said fuel tank to said carburetor, and a breather line for said fuel tank, including in combination a fuel-vapor absorbing device connected in said breather line, and means for conducting the fuel vapors from said carburetor to said fuel-vapor absorbing device after said engine is shut off and until said engine cools.

4. The device of claim 3 having means connecting said fuel-vapor absorbing device to said carburetor to suck fuel from said absorbing device when said engine is running.

5. A device for the control of evaporation losses from an automobile having a gasoline engine, an engine ignition switch, and a carburetor with an air cleaner, comprising the combination of: filter means for withdrawing gasoline from air; vapor conduit means from said carburetor and air cleaner to said filter means; pump means for said vapor conduit, thermally actuated means for operating said pump when said engine ignition switch is off and said engine is hot and until said engine cools considerably below its running temperature; and thermal leaning means connected to said carburetor for providing additional intake air to said carburetor for leaning the fuel-air mixture as the ambient temperature rises.

6. The device of claim 5 having conduit means for taking in air for said carburetor through said filter, thereby regenerating said filter.

7. A device for control of evaporation losses from an automobile, comprising a carburetor, a gasoline tank with a fuel line connected to the carburetor and a vent line, and filter means for withdrawing gasoline from air, connected to said gasoline tank vent line.

8. The device of claim 7 having filter-regenerating means, comprising means to take in air for said carburetor through said filter means.

[9. A device for control of evporation losses from an automobile having a carburetor and a gas tank with a fuel line connected to the carburetor, comprising the combination of: means for venting all the gasoline evaporated in said carburetor into a conduit returning to said carburetor, and means connected to said carburetor for leaning the fuel-air mixture in said carburetor as the temperature rises.]

10. A fuel system for an internal combustion engine comprising an intake manifold, a carburetor for supplying a combustible mixture to said intake manifold, said carburetor including a fuel reservoir, a fuel tank, a pump for delivering fuel from the fuel tank to the carburetor fuel reservoir, vent conduit means communicating with the fuel reservoir and fuel tank above the fuel level, said vent conduit means being adapted to communicate with said intake manifold, a fuel vapor storing device disposed in said vent conduit means intermediate the carburetor and intake manifold, said device including means for causing fuel vapors to flow through said conduit means for a predetermined period after said engine has been rendered inoperative.

11. A fuel system for an internal combustion engine comprising an intake manifold, a carburetor for supplying a combustible mixture to said intake manifold, said carburetor including a fuel reservoir, a fuel tank, a pump for delivering fuel from the fuel tank to the carburetor fuel reservoir, vent conduit means communicating with the fuel reservoir, and fuel tank above the fuel level, said vent conduit means being adapted to communicate with said intake manifold, means for reducing the vacuum in the conduit means whereby the reservoir and fuel tank are maintained under a light vacuum during normal engine operation, a fuel vapor storing device disposed in said vent conduit means intermediate the carburetor and intake manifold, said device including means for causing fuel vapors to flow through said conduit means for a predetermined period after said engine has been rendered inoperative.

12. A fuel system for an internal combustion engine comprising an intake manifold, a carburetor for supplying a combustible mixture to said intake manifold, said carburetor including a fuel reservoir, a fuel tank, a pump for delivering fuel from the fuel tank to the carburetor fuel reservoir, vent conduit means communicating with the fuel reservoir and fuel tank above the fuel level, said vent conduit means being adapted to communicate with said intake manifold, a fuel vapor storing device disposed in said vent conduit means intermediate the carburetor and intake manifold said device including means for causing fuel vapors to flow through said condiut means for a predetermined period after said engine has been rendered inoperative, said device being substantially inoperative to store fuel vapor during normal engine operation.

13. A fuel system as set forth in claim 10 in which said fuel flow causing means includes a pump.

14. A fuel system as set forth in claim 10 which includes a venting mechanism disposed in said vent conduit means posterior of said fuel vapor storing device whereby fuel free air from said device is discharged to the atmosphere when said engine is inoperative.

15. A fuel system as set forth in claim 10 in which the vapor storing device includes a container filled with a dessicant material through which the fuel vapor laden air from the reservoir and fuel tank is adapted to pass.

16. A fuel venting system for an internal combustion engine comprising an intake manifold, a carburetor mounted on said intake manifold and adapted to supply a fuel-air mixture thereto, said carburetor including a fuel reservoir, a fuel tank, means for delivering fuel from said fuel tank to said reservoir, conduit means communicating with said fuel tank and said reservoir above their respective fuel levels to the intake manifold through a fuel-vapor-absorbing filter having a restricted portion open to the atmosphere, said fuel tank and carburetor reservoir respectively including restricted atmospheric bleeds, the bleed for said fuel tank comprising said filter and means for controlling the manifold depression in said conduit means.

17. A fuel venting system for an internal combustion engine comprising an intake manifold, a carburetor mounted on said intake manifold and adapted to supply a fuel-air mixture thereto, said carburetor including a fuel reservoir, a fuel tank, means for delivering fuel from said fuel tank to said reservoir conduit means communicating with said fuel tank and said reservoir above their respective fuel levels to the intake manifold through a fuel-vapor-absorbing filter having a restricted portion open to the atmosphere, said fuel tank and carburetor reservoir respectively including restricted atmospheric bleeds, the bleed for said fuel tank comprising said filter and a regulator disposed in said conduit means for controlling the manifold depression in said conduit means.

*18. A device for the control of evaporation losses from an automobile having an engine, a carburetor and a carburetor bowl associated with said engine, a fuel tank, a fuel line extending from said fuel tank to said carburetor bowl, a breather line for said fuel tank including in combination a fuel vapor absorbing device separate from the carburetor air intake connected in said breather line, and conduit means for conducting the fuel vapors from said carburetor bowl to said fuel vapor absorbing device after said engine is shut off.*

*19. Apparatus for preventing loss of fuel constituents into the atmosphere from an internal combustion motor which comprises in combination: (1) a fuel reservoir; (2) an adsorption device separate from the carburetor air intake having a one end and another end and containing an adsorbent therein, said other end being in communication with the atmosphere; (3) an engine manifold communicating with the cylinders of said motor; (4) a first conduit characterized by being in open communication with said one end of said adsorption device and the upper area of said fuel reservoir; (5) a second conduit characterized by being in communication with said intake manifold and said one end of said adsorption device, whereby as fuel constituents are vaporized they will be adsorbed on said adsorbent in said adsorption device and whereby they will be desorbed by atmospheric air flowing from said other end to said one end by flowing intake air under the operating conditions of said engine.*

*20. A device for the control of evaporation losses from an automobile having an engine, a carburetor, a fuel tank, a fuel line connecting said fuel tank to said carburetor, and a breather line for said fuel tank, including in combination a fuel-vapor absorbing device separate from said carburetor air intake connected in said breather line, and means for conducting the fuel vapors from said carburetor to said fuel-vapor absorbing device after said engine is shut off.*

*21. The device of claim 20 having means connecting said fuel-vapor absorbing device to the engine to suck fuel from said absorbing device when said engine is running.*

References Cited by the Examiner

The following references, cited by the Examiner, are of record in the patented file of this patent or the original patent.

UNITED STATES PATENTS

| | | | |
|---|---|---|---|
| 708,942 | 9/1907 | Torchiani | 141—383 |
| 1,953,808 | 4/1934 | Kenneweg | 123—136 |
| 2,152,091 | 3/1939 | Rockwell | 123—136 |
| 2,462,575 | 2/1949 | Walker | 141—383 |
| 2,881,747 | 4/1959 | Gehner | 123—136 |
| 2,965,086 | 12/1960 | Gregory et al. | 123—136 |
| 2,986,380 | 5/1961 | Read | 261—39 |
| 3,001,519 | 9/1961 | Dietrich et al. | 123—136 |

MARK NEWMAN, *Primary Examiner.*

LAURENCE M. GOODRIDGE, *Examiner.*